(12) United States Patent
Nation et al.

(10) Patent No.: US 7,096,847 B1
(45) Date of Patent: Aug. 29, 2006

(54) OIL SEPARATOR FOR INTERNAL COMBUSTION ENGINE

(75) Inventors: Harrell Nation, Paris, TN (US); Michael Puckett, Paris, TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/707,182

(22) Filed: Nov. 25, 2003

(51) Int. Cl.
*F02M 35/00* (2006.01)

(52) U.S. Cl. .................................. 123/198 E
(58) Field of Classification Search ............. 123/41.86, 123/198 E, 198 R, 195 C
See application file for complete search history.

(56) References Cited

U.S. PATENT DOCUMENTS

| | | | |
|---|---|---|---|
| 4,569,323 A | 2/1986 | Okumura | |
| 4,602,595 A | 7/1986 | Aoki et al. | |
| 4,607,604 A | 8/1986 | Kanoh et al. | |
| 4,616,620 A * | 10/1986 | Paoluccio | 123/573 |
| 4,723,529 A | 2/1988 | Yokoi et al. | |
| 4,790,287 A * | 12/1988 | Sakurai et al. | 123/573 |
| 5,022,376 A | 6/1991 | Hudson, Jr. et al. | |
| 5,417,184 A * | 5/1995 | McDowell | 123/41.86 |
| 6,354,283 B1 | 3/2002 | Hawkins et al. | |
| 6,527,821 B1 * | 3/2003 | Liu et al. | 55/385.3 |
| 6,612,275 B1 * | 9/2003 | Immel et al. | 123/90.31 |
| 6,684,865 B1 * | 2/2004 | Hilpert | 123/574 |

* cited by examiner

*Primary Examiner*—Henry C. Yuen
*Assistant Examiner*—Jason Benton
(74) *Attorney, Agent, or Firm*—Rader, Fishman & Grauer PLLC

(57) ABSTRACT

An oil separator for an internal combustion engine includes a basket that houses a filter media for separating air from oil particles. A portion of the basket is disposed within a valve cover. A breather lid is fitted over the basket for sealing the filter media housed within the basket. Air is drawn through the breather lid and the filter media to separate the air from the oil particles contained in the filter media. The design may also include a baffle for preventing the oil from saturating the filter media. The integration of the filter media with sealing eliminates parts and maximizes the efficiency and effectiveness of separating the oil particles from the air.

8 Claims, 2 Drawing Sheets

OIL SEPARATOR FOR INTERNAL COMBUSTION ENGINE

FIELD OF THE INVENTION

The invention relates to an oil separator for separating lubrication oil from blow-by gas that is produced in an internal combustion engine.

DESCRIPTION OF THE RELATED ART

During the operation of an internal combustion engine, some gas in the combustion chamber may leak into the crank case through a gap between the piston and the cylinder during compression and explosion strokes. This gas, commonly referred to as "blow-by" gas, contains some amount of lublication oil constituents.

There have been proposed many devices for separating these lubrication oil constituents from the blow-by gas. For example, an oil separation case has been arranged in a cylinder-head cover to provide a zig-zag path for the blow-by gas by arranging baffle plates therein. The oil constituents contained in the gas are separated by means of the zig-zag path that makes the flow direction of gas change abruptly such that the gas can change its flow path abruptly, but the oil particles heavier than that gas cannot make the sudden change of its flow path. Consequently, the oil constituents collide against the wall and adhere thereto. As the number of oil constituents adhered to the wall increase, they form droplets and fall along the wall by their own weight. The blow-by gas from which the oil constituents have been extracted is sent to an intake manifold. However, fine oil particles tend to still pass through the oil separator with the gas. As a consequence, the lubrication oil is not completely separated from the gas.

One effective way to further separate the lubrication oil from the gas is by the use of a porous filter for absorbing the oil constituents. In accordance with such device, a porous filter made of foam metal is arranged vertically in the chamber for separation of oil. When the blow-by gas flows into the separation chamber and passes through the porous filter, the oil constituents in the blow-by gas are absorbed by the porous filter. The absorbed oil falls along the surface of the filter and is recycled back to the cylinder. However, the porous filter may become clogged due to foreign materials in the blow-by gas. If the porous filter becomes so clogged as to hinder the flow of gas through the filter, the pressure within the crank case can increase and the blow-by gas may leak outside the engine through other sealed areas of the engine, such as the gasket between the cylinder and the cylinder-head cover.

BRIEF SUMMARY OF THE INVENTION

To solve these and other problems associated with separating lubricating oil contained in blowby gases generated within an internal combustion engine, the inventors of the present invention have developed an oil separator comprising
a basket, a filter media at least partially disposed within the basket, and a breather lid operatively coupled to the basket for sealing the filter media therebetween. A portion of the basket is disposed within a valve cover of an engine. The basket contains at least one vent for allowing air and oil particles to pass therethrough. The oil separator is fastened onto an outer surface of the valve cover.

DETAILED DESCRIPTION OF THE INVENTION

Figure 1:
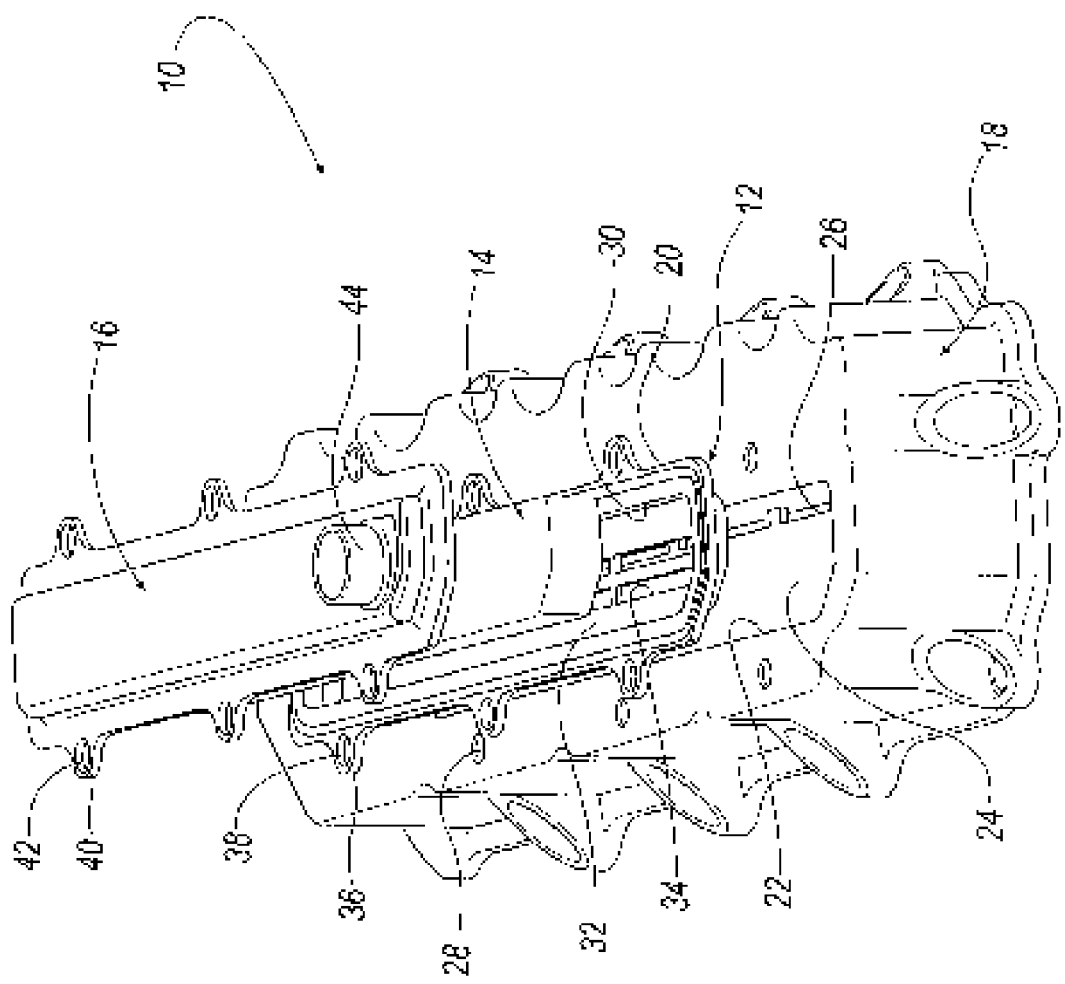
FIG. 1 shows an exploded perspective view of an oil separator according to an embodiment of the invention.
Figure 2:
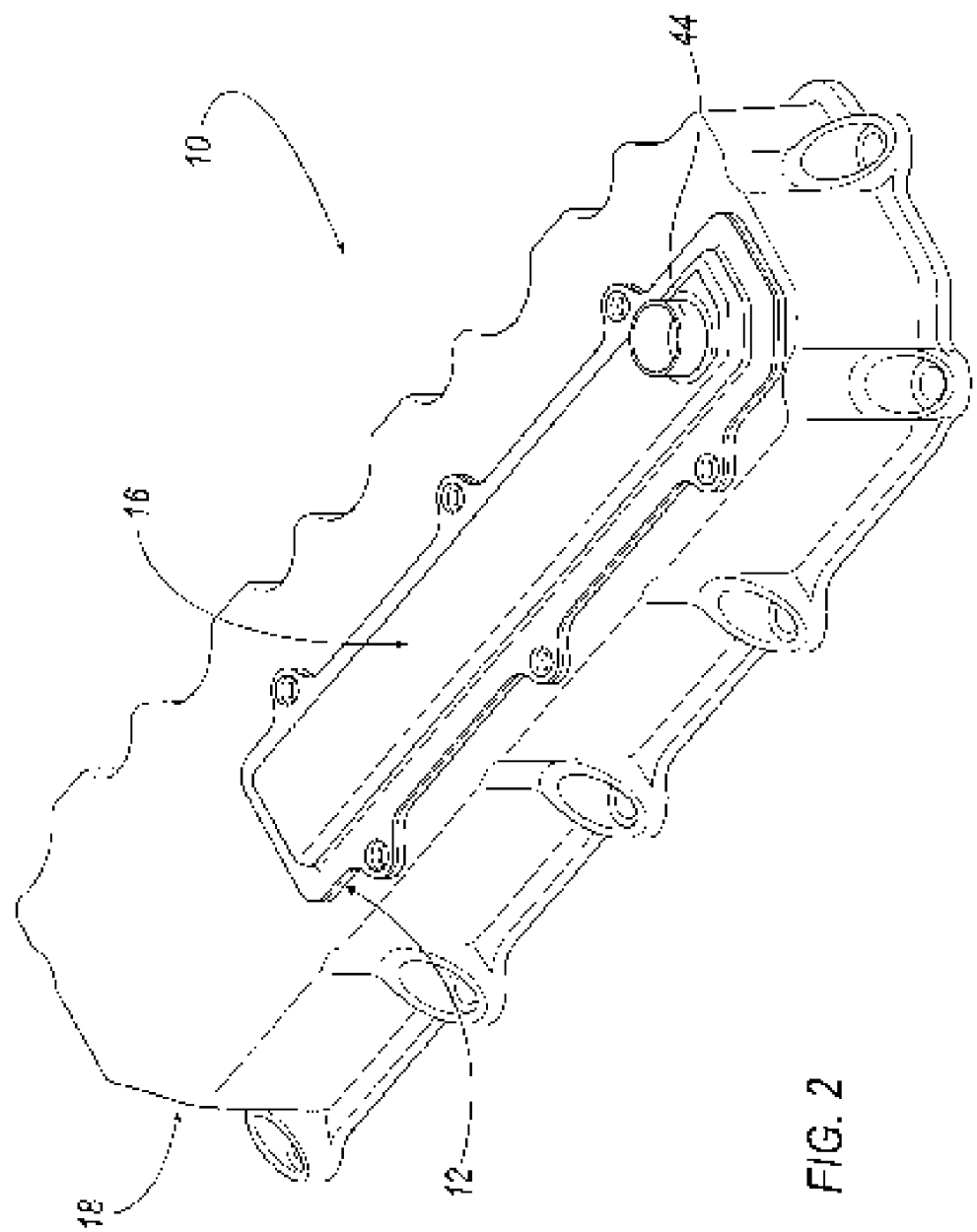
FIG. 2 shows a perspective view of the oil separator when assembled to a valve cover of an internal combustion engine.

Referring now to FIGS. 1 and 2, an oil separator, shown generally at 10, is illustrated according to an embodiment of the invention. The oil separator 10 includes a basket 12, a filter media 14 and a breather lid 16. The oil separator 10 is mounted to a valve cover 18 for a cylinder head of an internal combustion engine (not shown). The basket 12 includes a seal member, such as a gasket 20 mounted to both sides thereof (although only one side of the basket 12 is visible in FIG. 1) for sealingly mounting the basket 12 to the valve cover 18. The gasket 20 can be mounted to the basket 12 using any means known in the art. For example, the gasket 20 can be molded to the basket 12, or may be mounted within a groove or recess (not shown).

The valve cover 18 includes a recess 22 of sufficient dimensions to allow the basket 12 to be at least partially disposed within the recess 22. The recess 22 includes a bottom surface 24 with at least drain hole 26 for allowing the separated oil to drain back into the cylinder (not shown). The valve cover 18 also includes one or more threaded apertures 28 capable of receiving a threaded fastener (not shown) of a type well-known in the art, such as a bolt, or the like.

The basket 12 also includes a recess 30 of sufficient dimensions to be capable of receiving the filter media 14. A bottom surface 32 of the basket 12 includes one or more vents 34 for allowing the separated oil to drain back into the valve cover 18 and eventually back into the cylinder. As seen in FIG. 1, the bottom surface 32 of the basket 12 has a profile shape that generally corresponds to the profile shape of the recess 22 of the valve cover 18. The basket 12 includes one or more flanges 36 extending outwardly from the perimeter of the basket 12. Each flange 36 includes a mounting hole 38 capable of receiving the fastener when sealingly mounting the basket 12 to the valve cover 18. The number of flanges 36 generally corresponds to the number of apertures 28 in the valve cover 18 and are capable of being aligned with the threaded apertures 28 of the valve cover 18.

As seen in FIG. 1, the filter media 14 has a shape that generally corresponds to the shape of the recess 30 in the basket 12 such that at least a portion of the filter media 14 can be disposed within the recess 30. The filter media 14 provides a means for separating oil particles from the blow-by gas and can be made of any desirable material that has a high efficiency to collect oil particles. For example, the filter media 14 can be made of fiberglass material, wire mesh, foam metal, or the like. The blow-by gas flowing through the valve cover 18 decreases its flow-speed by colliding with the filter media 14, and oil constituents contained in the blow-by gas adhere to the filter media 14 in the form of oil drops. When the oil drops reach a particular size, they drop down through the one or more vents 34 into the valve cover 18, and then drain through the one or more drain holes 26 of the valve cover 18 back into the cylinder (not shown).

The breather lid 16 has a profile shape that generally corresponds to the profile shape of the basket 12. Similar to the basket 12, the breather lid 16 also includes one or more flanges 40 extending outwardly from the perimeter of the breather lid 16. Each flange 40 includes a mounting hole 42 capable of receiving the fastener when sealingly mounting the breather lid 16 to the basket 12. The breather lid 16 also includes an outlet port 44 to allow the flow of the blow-by gas from which the oil constituents have been extracted to exit the system. The outlet port 44 may communicate with an intake manifold (not shown) through a communicating means, such as a rubber pipe, or the like.

To assemble the oil separator 10 of the invention, a portion of the basket 12 is placed within the recess 22 of the valve cover 18. For ease of installation, each mounting hole 38 of the basket 12 should be substantially aligned with a corresponding aperture 28 of the valve cover 18. Then, the filter media 14 is placed within the recess of the basket 12. Next, the breather lid 16 is placed over the filter media 14 and the basket 12 such that each mounting hole 42 of the breather lid 16 is substantially aligned with each mounting hole 38 of the basket 12. Then, the basket 12 and the breather lid 16 with the filter media 14 disposed therein are fastened together to the valve guide 18, as shown in FIG. 2. It should be noted that the basket 12 is sealed to the valve cover 18 by the gasket 20 located on one side of the basket 12, and is also sealed to the breather lid 16 by the gasket 20 located on the opposite side of the basket 12. It will be appreciated that the assembly of the oil separator 10 is not order dependent. For example, the basket 12 and the breather lid 16 with the filter media 14 disposed therein can be assembled, and then the oil separator assembly can be fitted onto the outer surface of the valve cover 18.

In operation, blow-by gas containing lubrication oil constituents enters through the at least one drain hole 26 at the bottom 24 of the valve cover 18, travels through the one or more vents 34 of the basket 12, and into the filter media 14. The filter media 14 causes the oil particles to adhere to the filter media 14 and separate from the blow-by gas. When the oil drops reach a particular size, they drop down through the one or more vents 34 into the valve cover 18, and then drain through the one or more drain holes 26 of the valve cover 18 back into the cylinder (not shown). The blow-by gas with the oil particles separated therefrom exits through the outlet port 44.

While the invention has been specifically described in connection with certain specific embodiments thereof, it is to be understood that this is by way of illustration and not of limitation, and the scope of the appended claims should be construed as broadly as the prior art will permit.

The invention claimed is:

1. An oil separator for an internal combustion engine, comprising:
   a valve cover, said valve cover having a recess with at least one drain hole formed therein;
   a basket at least partially disposed in said recess and sealingly mounted to said valve cover, the basket containing at least one vent for allowing blow-by gas and oil particles to pass therethrough;
   a breather lid sealingly mounted to the basket; and
   a filter media disposed between the basket and the breather lid for separating oil particles from the blow-by gas.

2. The oil separator according to claim 1, wherein the basket forms a seal with the valve cover.

3. The oil separator according to claim 1, wherein the basket forms a seal with the breather lid.

4. The oil separator according to claim 1, wherein the breather lid includes an outlet port for allowing the blow-by gas to exit the oil separator.

5. An oil separator for an internal combustion engine, comprising:
   a valve cover, said valve cover having a recess with at least one drain hole formed therein;
   a basket at least partially disposed in said recess and sealingly mounted to said valve cover, the basket containing at least one vent for allowing blow-by gas and oil particles to pass therethrough;
   a breather lid sealingly mounted to the basket; and
   means disposed between the basket and the breather lid for separating oil particles from the blow-by gas.

6. The oil separator according to claim 5, wherein the basket forms a seal with the valve cover.

7. The oil separator according to claim 5, wherein the basket forms a seal with the breather lid.

8. The oil separator according to claim 5, wherein the breather lid includes an outlet port for allowing the blow-by gas to exit the oil separator.

* * * * *